Jan. 27, 1942.  J. BRAVERMAN  2,271,413
DECALCOMANIA AND THE LIKE
Filed April 15, 1940
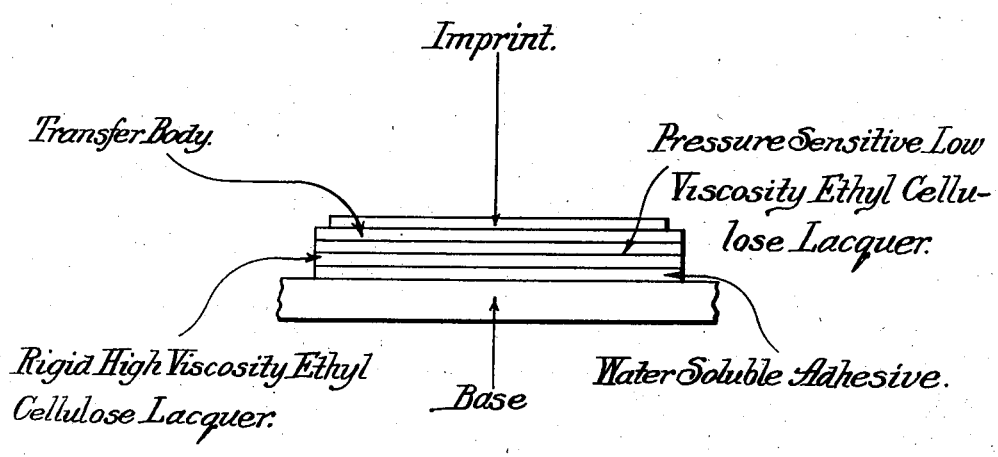
Inventor:
Jack Braverman,
By Britton, Wiles, Davies, Kirschke & Dawson,
Attys.

Patented Jan. 27, 1942

2,271,413

UNITED STATES PATENT OFFICE 2,271,413

DECALCOMANIA AND THE LIKE

Jack Braverman, Chicago, Ill., assignor to American Decalcomania Company, Inc., Chicago, Ill., a corporation of Illinois Application April 15, 1940, Serial No. 329,799

12 Claims. (Cl. 41—33)

This invention relates to a decalcomania and the like.

An object of the invention is to provide a decalcomania which can be handled readily and applied to difficult surfaces. A further object is to provide a decalcomania and the like which may be stored over long periods of time but which when moistened with water to release the transfer, provides a sturdy adhesive power for affixing it to difficult surfaces. A further object is to provide an improved decalcomania which may be applied to a metal or other surface and baked thereon, giving an extremely sturdy and non-scratchable transfer, giving the effect of being a part of the metal surface to which it is attached.

The invention is illustrated, in a preferred embodiment, by the accompanying drawing, in which the single figure represents a side view in elevation of a decalcomania product embodying my invention.

The decalcomania or the like, as illustrated, may consist of a base formed of any suitable material, a layer of water-soluble adhesive on the base, a rigid ethyl cellulose lacquer, described in detail hereinafter, a layer of pressure-sensitive ethyl cellulose lacquer, described in greater detail hereinafter, and a transfer body over the pressure-sensitive lacquer layer. The transfer body may be provided with the usual imprint.

The base may be formed of paper or any other suitable material. I prefer to employ paper through which the water must pass readily to dissolve the water-soluble adhesive and thus release the transfer.

The relatively rigid layer of ethyl cellulose lacquer will preferably be composed of a high viscosity ethyl cellulose containing comparatively little plasticizers in order to provide a rigid and fragile film. Ethyl cellulose of the high viscosity type is preferable because this type of ethyl cellulose, upon drying, leaves a thin coat of solid content upon the layer below.

The next layer preferably consists of a low viscosity type of ethyl cellulose. The lacquer made from this type of ethyl cellulose will necessarily contain a considerably higher percentage of solids than the aforementioned rigid high viscosity type of cellulose lacquer. Furthermore, in the formulation of the low viscosity lacquer, care will be taken that more chemical plasticizer is used on the weight unit of ethyl cellulose than in the case of the high viscosity and fragile lacquer. The following plasticizers may be advantageously used:

Dibutyl phthalate.
Dibenzyl phthalate.
Tricresyl phosphate in admixture with resin plasticizers and rubber solutions.

The water-soluble adhesive upon the base may be of any suitable type which will form a bond and which, upon being dissolved in water, releases the upper portions of the transfer structure.

When pressure-sensitive lacquer is employed with water-soluble adhesive, it is found that the lacquer tends to work through the water-soluble material and eventually engage the paper, particularly because of the high plasticizer content of the lacquer. Thus, after a period of time, release of the transfer can be effected only with difficulty because the pressure-sensitive lacquer is not readily water-soluble. Further, the penetration of the water-soluble adhesive to any extent by the pressure-sensitive lacquer seems to render it less soluble in water and thus prevents a quick release. Also, it is found that where pressure-sensitive lacquer is employed in conjunction with a transfer, the softness of the adhesive makes the entire transfer difficult to handle. It is pliable and soft and can be cut into readily, even with the finger nails, while the same is being handled.

I have found that by employing a lacquer layer having comparatively little plasticizer content and being therefore relatively rigid, the transfer body can then be readily handled without distortion or injury, while at the same time the layer prevents the penetration of the water-soluble adhesive by the pressure-sensitive lacquer or plasticizer ingredients of the pressure-sensitive lacquer.

Although ethyl cellulose has, from my experience, proved to be most satisfactory for the above purposes, it will be understood that other equivalent lacquers may be formed for producing the stated results.

The rigid layer described is preferably of such thickness as to serve the function of providing rigidity and preventing penetration of the water-soluble layer, while at the same time permitting a breaking or cracking of the layer when the transfer is applied under pressure, the breaks in the layer permitting the pressure-sensitive lacquer to pass therethrough and attach the transfer body to the desired surface. The breaking of the relatively rigid layer is facilitated by a partial dissolving thereof through contact with the upper pressure-sensitive layer.

The transfer body itself may be formed of the usual or any suitable materials. A ground coat may be formed over the pressure-sensitive adhesive and the transfer body may be built up by ink, lacquer, paint, or any suitable material. Upon the transfer body may be formed the usual imprint.

In the operation of the device, when water is applied to the base, the water-soluble adhesive readily releases the structure thereabove and the structure is slid off the paper onto the surface to which it is to be attached. Slight pressure upon the transfer body cracks the rigid lacquer layer and causes the pressure-sensitive lacquer to flow through and about the layer so as to attach the transfer body to the surface.

To increase the rigidity of the transfer, I prefer to add a metal powder, such as, for example, aluminum bronze, to the transfer body. This powder may be incorporated in the paint or other material used for forming the transfer body. When the transfer becomes dry, the powdered metal forms a rigid transfer body. The metal powder further aids in forming a good product where the transfer is baked onto a surface. The lacquer layer and the reinforced transfer body thus provide two relatively rigid layers between which the soft pressure-sensitive lacquer is housed and protected.

The transfer body sticks to all kinds of hides, such as are used for shoes, skins of fruit, bare metals, and other extremely difficult surfaces. The printing upon the transfer may give a graining or marble effect or any other desired design. It is found that extremely attractive graining and imitation marble effects may be produced upon the transfer.

In the use of the term high viscosity lacquer layer as employed in the specification and in the claims, it will be understood that the term means not only a lacquer body but any like material which may be employed for forming a layer having the characteristics of preventing penetration of the water-soluble adhesive by the pressure-sensitive lacquer, providing increased rigidity and frangibility to the extent of permitting the pressure-sensitive lacquer to flow through cracks in the layer when the transfer is applied under pressure to a surface.

It is a well-known fact that the usual type of decalcomania shows no or only very unsatisfactory adhesion on bare metals or alloys, as, for instance, galvanized iron, cadmium, chromium, brass, zinc, tin. While the above-described pressure-sensitive decalcomania shows a satisfactory adhesion on metals, as, for instance, the above-described, their use would be objectionable because of their relative softness. It is, therefore, suggested that the pressure-sensitive decalcomania be placed upon the object to which it is to be affixed and baked thereon. I have found that by further increasing the ethyl cellulose content of the two lacquers described above, comparatively good heat and baking resistance can be secured. I have found, however, that urea-formaldehyde resin incorporated into the ethyl cellulose lacquers in a small amount increases the hardness of the baked-on transfer to a very great extent, thus providing, after the baking operation is finished, an unscratchable surface which practically becomes part, in effect, of the metal surface to which it is attached. It is optional to incorporate the urea-formaldehyde resin into the low viscosity ethyl cellulose only, or into both, or even in the transfer body.

While in the foregoing specification, I have set forth certain specific materials and steps for the purpose of illustrating one mode in which the invention may be carried out, it will be understood that a wide variation in such materials and steps may be made by those skilled in the art without departing from the spirit of my invention.

I claim:

1. A decalcomania and the like comprising a base, a water-soluble adhesive thereon, a lacquer layer upon said water-soluble adhesive, a pressure-sensitive lacquer upon said lacquer layer, and a transfer body upon said pressure-sensitive lacquer.

2. A decalcomania and the like comprising a base, a water-soluble adhesive thereon, an isolating layer of lacquer upon said water-soluble adhesive, a pressure-sensitive lacquer upon said isolating layer, said layer preventing said pressure-sensitive material from penetrating said water-soluble adhesive, and a transfer body upon said pressure-sensitive lacquer.

3. A decalcomania and the like comprising a water-permeable base, a water-soluble adhesive thereon, a frangible layer of a relatively hard lacquer upon said water-soluble adhesive, a pressure-sensitive lacquer upon said layer, said layer preventing said pressure-sensitive lacquer from penetrating said water-soluble adhesive, and a transfer body upon said pressure-sensitive lacquer.

4. A decalcomania and the like comprising a water-permeable base, a water-soluble adhesive thereon, a transfer body provided on its underside with pressure-sensitive lacquer, and a lacquer layer more rigid than said pressure-sensitive lacquer extending between said pressure-sensitive lacquer and said water-soluble adhesive.

5. A decalcomania and the like comprising a water-permeable base, a water-soluble adhesive thereon, and a transfer structure upon said water-soluble adhesive consisting of two relatively rigid layers and a pressure-sensitive lacquer layer therebetween.

6. In a decalcomania and the like, a water-permeable base, a water-soluble adhesive thereon, a transfer body reinforced with metal powder to form a rigid layer, a pressure sensitive lacquer secured to the underside of said transfer body, and a relatively harder layer of lacquer under said pressure sensitive lacquer.

7. In a decalcomania and the like, a water-permeable base, a layer of water-soluble adhesive thereon, a lacquer layer upon said water-soluble adhesive, a pressure-sensitive lacquer upon said lacquer layer, and a transfer body carried by said pressure-sensitive lacquer, said lacquer layer being frangible under pressure but of greater rigidity than said pressure-sensitive lacquer.

8. A decalcomania comprising a paper base, a water-soluble adhesive thereon, and a transfer structure carried by said water-soluble adhesive consisting of a layer of lacquer frangible under pressure, a pressure-sensitive lacquer over said lacquer layer and normally prevented thereby from penetrating said water-soluble adhesive, and an imprint-equipped transfer body carried by said pressure-sensitive lacquer.

9. A decalcomania comprising a base, a water-soluble adhesive thereon, a high viscosity ethyl cellulose lacquer layer carried by said water-soluble adhesive, a low viscosity ethyl cellulose lacquer layer carried by said first-mentioned ethyl cellulose layer, and an imprint-equipped transfer body carried by said low viscosity ethyl cellulose lacquer layer.

10. A decalcomania comprising a base, a water-soluble adhesive thereon, a layer of high viscosity ethyl cellulose lacquer upon said water-soluble adhesive, a layer of low viscosity ethyl cellulose lacquer containing a plasticizer upon said high viscosity layer, and a transfer body upon said low viscosity ethyl cellulose lacquer layer.

11. In a decalcomania and the like, a water-permeable base, a water-soluble adhesive thereon, a layer of ethyl cellulose lacquer containing a small amount of a plasticizer upon said water-soluble adhesive, a second layer of ethyl cellulose lacquer containing a large amount of plasticizer, and a transfer body carried by said last mentioned lacquer layer.

12. A heat-fast decalcomania providing a transfer suitable for baking on surfaces, comprising a base, a water-soluble adhesive carried thereby, a high viscosity ethyl cellulose lacquer layer, a low viscosity ethyl cellulose lacquer layer, and a transfer body layer upon said low viscosity cellulose lacquer layer, at least one of said layers containing a urea-formaldehyde resin.

JACK BRAVERMAN.